April 20, 1937.  A. JENSEN  2,078,000
APPARATUS FOR TREATING LIQUIDS
Filed Feb. 13, 1933  3 Sheets-Sheet 1
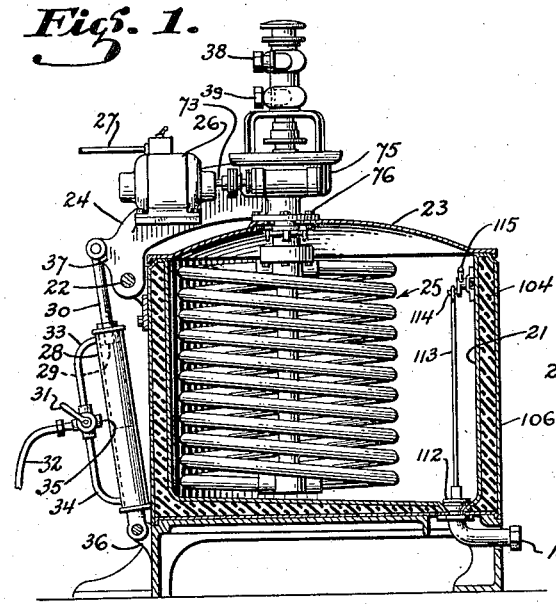
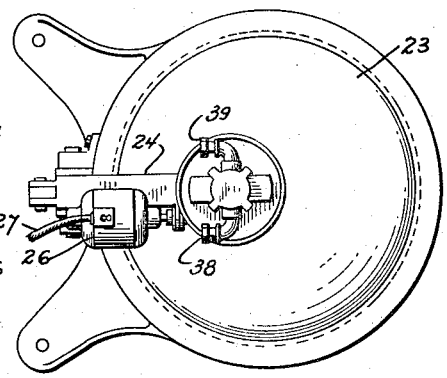
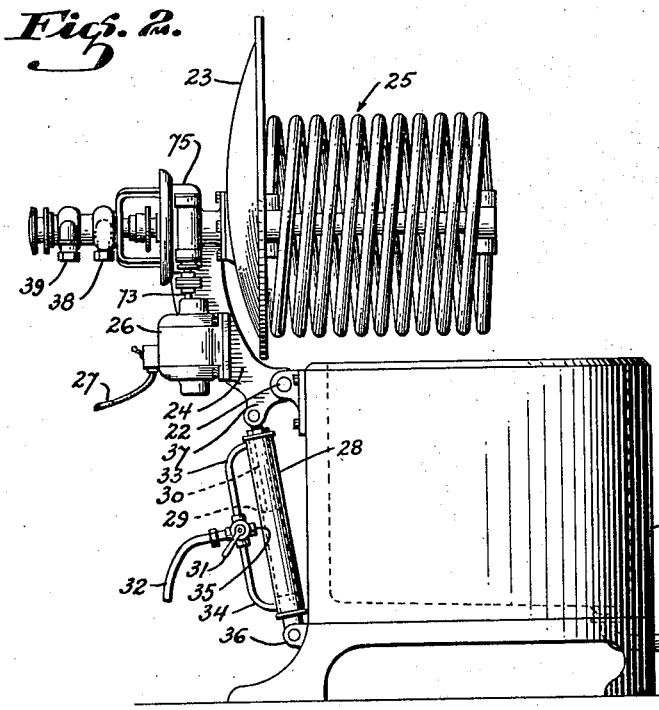
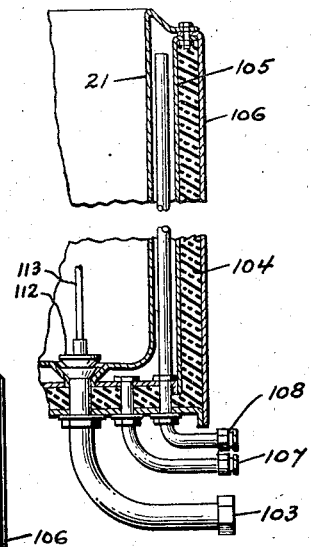
INVENTOR.
Aage Jensen.
BY Townsend and Loftus.
ATTORNEYS.

April 20, 1937.　　A. JENSEN　　2,078,000
APPARATUS FOR TREATING LIQUIDS
Filed Feb. 13, 1933　　3 Sheets-Sheet 2

INVENTOR.
Aage Jensen.
BY Townsend and Loftus
ATTORNEYS.

April 20, 1937.  A. JENSEN  2,078,000
APPARATUS FOR TREATING LIQUIDS
Filed Feb. 13, 1933  3 Sheets-Sheet 3
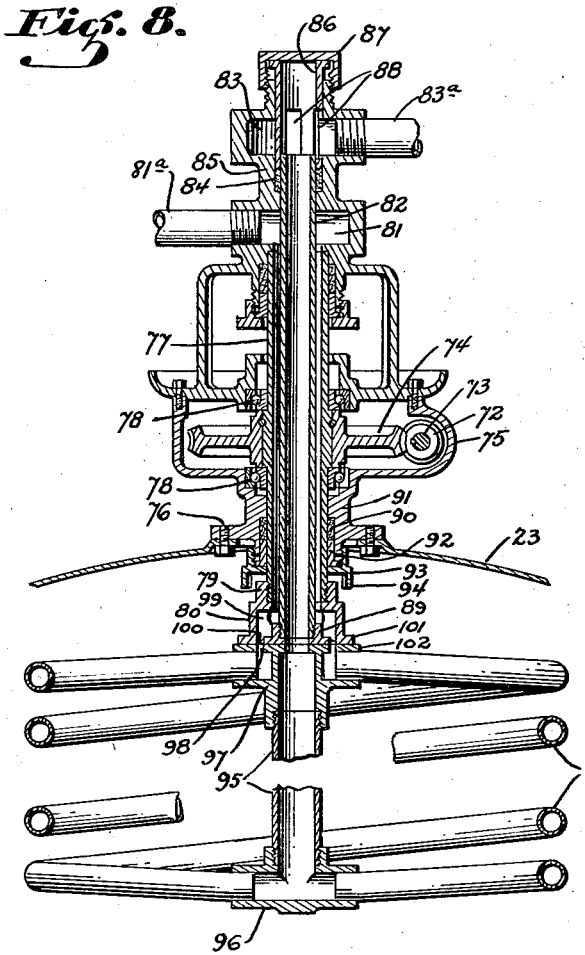
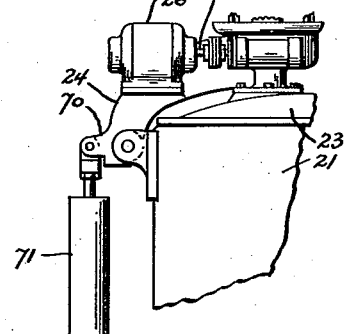
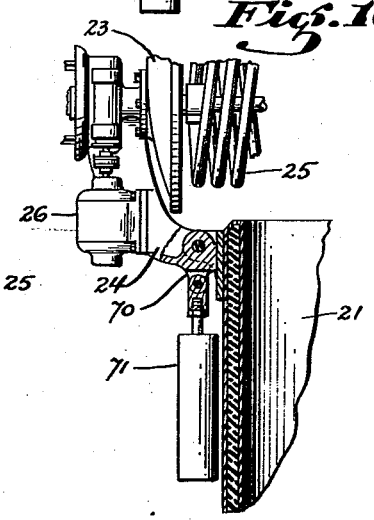
INVENTOR.
Aage Jensen.
BY Townsend & Loftus
ATTORNEYS.

Patented Apr. 20, 1937

2,078,000

UNITED STATES PATENT OFFICE 2,078,000

APPARATUS FOR TREATING LIQUIDS

Aage Jensen, Los Angeles, Calif.; Maude Margaret Jensen executrix of said Aage Jensen, deceased Application February 13, 1933, Serial No. 656,555

3 Claims. (Cl. 257—104)

This invention relates to apparatus for treating liquids, and especially to the thermal treatment of liquids in such a manner that uniform temperatures will exist throughout the mass of liquid treated.

The present invention is especially designed for the treatment of milk and thick or thin milk products, but is applicable also in other arts.

An object of the invention is the production of an apparatus whereby milk, milk products and other liquids may be uniformly heated or cooled. Another object of the invention is the production of an apparatus of the type described comprising a container and thermal treatment and stirring means, easily and quickly movable into and out of said container, whereby interruptions for cleaning purposes are shortened and cleaning is facilitated. Another object of the invention is to maintain the means removed from within the container in such a position above the container that the time of dripping therefrom back into the container will be shortened. Other objects of the invention will become apparent on reading the appended specification, taken in connection with the accompanying drawings which form a part thereof.

Referring to such drawings—

Fig. 1 is an elevational view, partly in section, of one exemplification of my invention in closed or operative position;

Fig. 2 is an elevational view thereof in open or inoperative position;

Fig. 3 is a top plan view thereof;

Fig. 7 is an enlarged sectional view showing details of tank construction;

Fig. 8 is an enlarged sectional view illustrating means for conveying the thermal treatment fluid to and from a rotating coil;

Fig. 9 is a fragmental, elevational view showing a weight-counterbalanced cover and appurtenant parts, the cover being in closed position; and Fig. 10 is a similar view, but partly in section, showing the cover in open position and the treatment means out of the tank.

Figure 4:
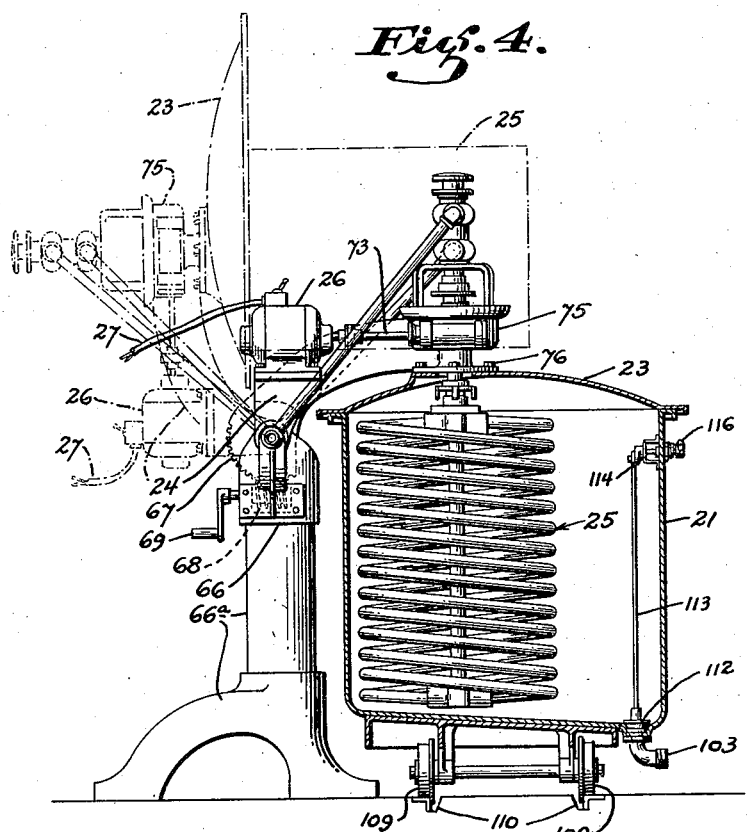
Fig. 4 is an elevational view, partly in section, of a modification.

Referring to Figs. 1, 2 and 3, my invention comprises a container or tank 21 for containing the liquid to be treated, which may be milk, buttermilk, cream or, in fact, any other liquid capable of treatment in this apparatus; and hinged at 22 to said tank is a cover member 23 which can be swung up to open or down to close the tank at the top thereof. In the present instance the cover need not be hinged directly to the tank but is preferably carried by a bent arm 24 hinged thereto, the cover being fixed to this arm. The cover carries a coil 25 through which thermal treatment fluid, such for example, as steam, water or cold brine, may flow while the coil is rotated, the rotation in the present instance being caused by an electric motor 26 to which power leads 27 are suitably connected. The motor rotates the coil by means of a suitable interposed mechanical movement, and for this purpose I prefer a worm pinion and gear, the pinion being mounted on the motor shaft and the gear on the coil axis of rotation, as hereinafter referred to.

In this exemplification of my invention I show a hydraulic means for closing and opening the cover member. Such hydraulic means comprises a hollow cylinder 28, a piston 29 reciprocably movable therewithin, a piston rod 30 fixed to the piston, and means to flow fluid under pressure to one side of the piston and exhaust it from the other, or vice versa; such means comprising a multi-way valve operated by a single handle 31, the parts of which are so arranged that fluid under pressure will flow from the supply conduit 32 through the branch pipe 33 into the cylinder above the piston while any fluid in the cylinder below the piston will flow through the branch pipe 34 out through the exhaust 35, for the purpose of opening up the cover and removing the coil from the tank, as shown on Fig. 2.

To close the cover and thereby insert the coil into the tank, as shown on Fig. 1, the valve handle is moved as illustrated, whereby liquid under pressure flows from the supply conduit 32 through the branch pipe 34 into the cylinder below the piston, while any fluid in the cylinder above the piston is wasted through the pipe 33 and the exhaust 35.

The cylinder is pivotally supported at its lower end on a supporting member 36, while the piston rod is pivotally connected at its upper end to a lug 37 fixed to the arm 24. Fluid treatment means for passage through the coils in this exemplification may enter and exit through flexible hose connections (not shown) attached to the couplings 38, 39.

Figure 5:
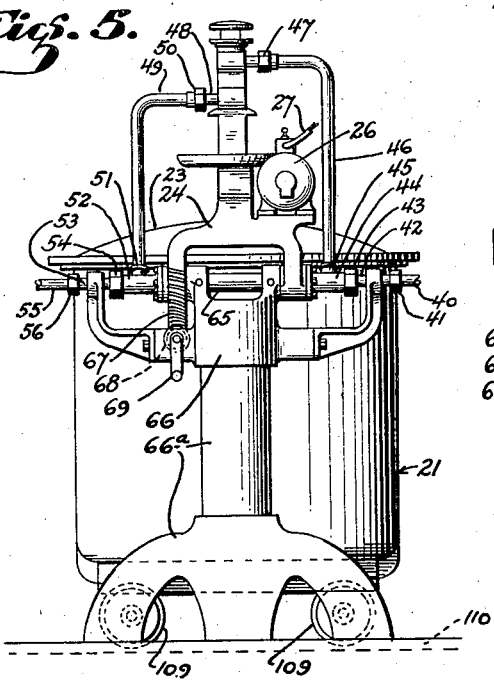
Fig. 5 is an end view taken from the left side of Fig. 4.
Figure 6:
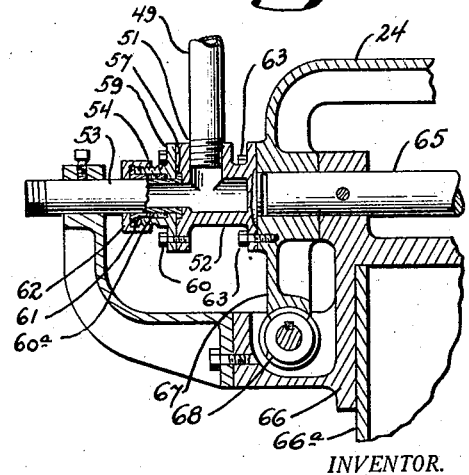
Fig. 6 is an enlarged sectional view showing certain details of the modification of Figs. 4 and 5.

In Figs. 4, 5 and 6, I illustrate a modification similar to the first, but differing in the means for opening and closing the cover and, also, in that metal pipes are used for conveying the thermal treating medium instead of the flexible hose connections. The thermal treatment medium enters through the stationary pipe 40 through the connection 41 into the stationary pipe 42, and thence through the connection 43 into the pipe 44, which is rotatable about its own axis. Connected at 45 to the pipe 44 is the pipe 46, which is also connected by the connection 47 to the conduit which supplies the coil. The fluid flowing from the coil exits at 48, to which the pipe 49 is suitably connected by the connection 50. The pipe 49, by means of the connection 51, is connected to the pipe fitting 52, which also can rotate about its own axis, and to this is connected the fixed pipe 53 by the connection 54. A pipe 55 for conveying away the fluid treating medium is attached by the connection 56 to the pipe 53.

The means for connecting the rotatable pipe 44 to the fixed pipe 52 is similar to that for connecting the pipes 49 and 53, and I will therefore describe only one such connection. Fig. 6 shows this in enlarged detail, where it will be seen that the pipe 53 has a flange 57 at the end thereof, which is set into the fitting 52 at one opening thereof. A packing box 59 is held by bolts 60 against the fitting 52 thereby confining the flange, while in this box is the usual packing material 60a, gland 61, and gland nut 62; so that there is a fluid-tight connection between the pipe 53 and the fitting 52. The fitting 52 is attached as by bolts 63 to the arm 24, which may, if desired, be bifurcated as shown on Fig. 5, and which is rotatable about the ends of a fixed shaft 65 mounted in the member 66 which, in turn, is supported on a standard 66a. On the arm 24 which carries the cover 23, the motor 26, etc., is a worm gear 67 which is operated by a worm pinion 68 which, in turn, is operated by a manually operable crank handle 69. The shaft 65, the fittings 44, 52, and the arm 24 have a common axis of rotation whereby they may all be rotated as a unit.

If desired, the cover and appurtenant parts may be moved to open or closed position merely by pushing with the hand and without any mechanism, either automatic or manually operable, and with this in view I may counterbalance the cover and the parts mounted thereon, as illustrated on Figs. 9 and 10. In such exemplification of the invention, I provide a lever arm 70 on the arm 24, at the end of which I rotatably attach a counterweight 71 suitably to counterbalance the weight of the movable parts so that closing and opening of the cover by mere pushing or pulling by hand will be facilitated.

The structure whereby the fluid-treating medium is conveyed to, through and from the coil or coils is illustrated on Fig. 8. A worm pinion 72, mounted on the motor shaft 73, drives a worm gear 74 within the stationary housing 75, which housing is suitably fixed and supported on the cover member 23 in any suitable manner, as by means of bolts 76. A hollow shaft 77 is mounted for rotation in bearings 78, the lower end of this shaft being fitted into the upstanding flange 79 of the fitting 80. The upper end of this shaft leads into the outlet chamber 81, having an outlet fitting 81a connected thereinto and corresponding to the part 39 on Figs. 1 and 3, or 50 on Fig. 5. A hollow shaft 82 within, spaced from, and concentric with the hollow shaft 77 connects at its upper end with the inlet chamber 83, which has an inlet fitting 83a corresponding to the part 38 on Fig. 3, or the part 47 on Fig. 5.

Packing material 84 is interposed between the upper part of the hollow shaft 82 and the wall of the casing 85, above which is a gland 86 to compress the packing on turning the screw-cap gland nut 87. The gland 86 has perforations 88 therein to permit ingress of fluid from the chamber 83 to the inside of the hollow shaft 82. The hollow shaft 82 is connected at its bottom to the inner upstanding flange 89 formed on the member 80 and, as will be seen on Fig. 8, two passages are formed, one within the hollow shaft 82 and one between the hollow shafts 82 and 77, one being for ingress of treating medium to the coil or coils and the other being for egress therefrom. Packing material 90 may be interposed between the outside of the outer hollow shaft 77 and the supporting wall 91 for the purpose of preventing leakage of lubricating oil from the bearings or gears, and the usual gland 92 is provided with the gland nut 93, which may have gripping lugs 94 thereon for easy manipulation thereof.

As one embodiment of my invention I disclose on Fig. 8 two parallel, helical coils, each of which receives treating medium from the inside of the inner hollow shaft 82. A coil mounting is provided which comprises a hollow shaft-like member 95, at the lower end of which is a T-fitting 96 to accommodate the lower ends of the two coils so that the lower ends of the coils form branches diverging from the member 95. The upper ends of the coils are connected into a fitting 97, having openings 98 therein. The chamber between the two hollow shafts 77 and 82 terminates below in a chamber 99, which likewise has openings 100 registering with the openings 98. The parts 101 and 102 are suitably attached to each other in a leak-proof manner so that the inner and outer hollow shafts and the coils will be rotated by the worm gear.

On Fig. 4 I illustrate a simple tank 21 having a treated product outlet 103; on Fig. 1 I illustrate a double-walled tank having insulating material 104 between the walls thereof; while on Fig. 7 I illustrate a tank 21 having insulation 104 between the walls 105 and 106, the wall 105 being spaced from the tank wall 21 to provide for circulation about the tank wall 21 of a thermal treatment medium, and with this in view I provide a supply pipe 107 and an overflow pipe 108. It is to be understood, however, that different types of tanks may be used interchangeably with the different mechanisms shown, and that different cover-lifting devices and different coils may be used with any type of tank, the choice of which will depend upon the particular conditions of operation.

Any type of helical thermal treatment coil may be used, such as shown in my prior patents—No. 924,233 granted June 8, 1909, No. 949,769 granted Feb. 22, 1910, No. 1,156,361 granted Oct. 12, 1915, No. 1,738,953 granted Dec. 10, 1929, No. 1,738,954 granted Dec. 10, 1929, No. 1,759,405 granted May 20, 1930, and No. 1,772,898 granted Aug. 12, 1930. I prefer to have a helical coil and if more than one coil be used, that they be wound in the same direction so that rotation thereof will cause movement of the liquid whereby it will attain a uniform temperature, and with this in view I prefer that the coil be arranged eccentrically with respect to the tank, as disclosed and/or claimed in some of said prior patents. The coil or coils and tank are, of course, so dimensioned that the coil can be swung into and out of the tank on tilting the cover to close or open it, and as a rule I prefer the diameter of the helix or helices, as distinguished from that of the conduit wound into the helix, to be very close to the maximum permitted by such relationship.

The cover may be attached to the tank as shown, for example, on Figs. 1 and 9, or it may be supported independently of the tank as shown on Fig. 4; and it is to be understood that such feature may be used interchangeably with the various mechanisms and devices shown.

On Fig. 1 I have illustrated a stationary tank, while on Fig. 4 I show the tank and coil as relatively movable to each other and without swinging the cover when the cover is open, this permitting of progressive treatment as described and claimed in my application, Serial No. 406,872, filed November 13, 1929, entitled "Method of treating liquids", the same being a division of my application, Serial No. 147,244, filed November 9, 1926, and now the above-mentioned Patent No. 1,738,953, granted December 10, 1929. With this in view, I may mount a tank of any construction desired on wheels 109 and for facility of operation these may run on tracks 110, although it is to be understood that such tracks may be omitted.

I prefer to close off the outlet 103 by means of a removable plug 112, which may be supported on a rod 113 connected at its upper end to a crank 114 operable by a crank handle member 115 within the tank, as illustrated on Fig. 1, or by a crank handle member 116 outside of the tank, as illustrated on Fig. 4. It is, of course, understood that the crank handle member may be inside of the tank or outside of the tank, as desired, in any modification, and that any means for raising and lowering the plug 112 to open or close, respectively, the outlet 103 may be used, and for this purpose I may use the device described and claimed in my Patent No. 1,848,632, granted March 8, 1932, on "Sanitary lift valve."

While I have described various embodiments of my invention, I have done so only by way of illustration and not as a limitation of the invention, the scope of which is defined in the appended claims.

Having described my invention, what I claim and desire to secure by Letters Patent is —

1. A device for treating liquids, comprising a container open at the top, a cover therefor mounted to swing down and up to close and open the same, a helical, rotatable, thermal treatment coil mounted to swing with said cover to move into and out of said container, said coil when said cover is closed being eccentric of said container and thereby more closely adjacent one wall part thereof than another wall part thereof, the lower end of said coil first receding from and then approaching said first wall part on opening and closing movements of said cover, means to rotate said coil, means simultaneously to convey thermal treatment medium therethrough, and a support, said cover and coil forming a unit swingingly mounted on said support, said support and said container being mounted independently of each other so that said unit and said container may be moved bodily relatively to each other when said cover is open.

2. A device for treating liquids, comprising a container having an upwardly extending opening, a hinged cover for said opening, a helical, rotatable, thermal treatment coil mounted to swing with said cover to move into and out of said container, said coil when in said container being eccentric thereof and thereby more closely adjacent one wall part of said container than any other wall part thereof, the hinge for said cover being outside the horizontal section of said container and in line with said treatment coil and said first mentioned wall part, means to rotate said coil, means to convey thermal treatment medium therethrough, and a support, said cover and coil forming a unit hinged on said support, said support and said container being mounted independently of each other so that said unit and said container may be moved bodily relatively to each other when said cover is open.

3. A device for treating liquids, comprising a container open at the top, a hinged cover therefor mounted to swing down and up to close and open the same, a helical, hollow, rotatable, thermal treatment coil mounted on said cover to swing therewith to move into and out of said container, said coil when said cover is closed being eccentric of said container and thereby more closely adjacent one wall part thereof than another wall part thereof, the hinge for said cover being outside the horizontal section of said container and in line with said treatment coil and said first mentioned wall part, means mounted on said cover to rotate said coil, fixed connections mounted on said cover and swinging therewith to convey thermal treatment fluid to and from said coil, connections to supply and receive thermal treatment fluid to and from said fixed connections, and a fixed support, said cover and coil forming a unit swingingly mounted on said support, said container being movable with respect to said support.

AAGE JENSEN.